United States Patent
Broberg et al.

(10) Patent No.: US 8,321,837 B2
(45) Date of Patent: Nov. 27, 2012

(54) TECHNIQUES FOR MINIMUM PERMISSIONS DETECTION AND VERIFICATION

(75) Inventors: Eric D. Broberg, Redmond, WA (US); Matthew B. Jeffries, Kirkland, WA (US); Matthew Cohen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1609 days.

(21) Appl. No.: 11/337,725

(22) Filed: Jan. 23, 2006

(65) Prior Publication Data

US 2007/0174899 A1    Jul. 26, 2007

(51) Int. Cl.
*G06F 9/44* (2006.01)
(52) U.S. Cl. .......... 717/124; 717/125; 717/134; 717/135
(58) Field of Classification Search .................. 717/124, 717/125, 134, 135; 726/4
See application file for complete search history.

(56) References Cited

U.S. PATENT DOCUMENTS

| | | | |
|---|---|---|---|
| 5,163,147 A * | 11/1992 | Orita ...................... 707/999.009 |
| 2003/0167401 A1* | 9/2003 | Murren et al. ................ 713/200 |
| 2007/0186102 A1* | 8/2007 | Ng .................................. 726/26 |
| 2007/0254631 A1* | 11/2007 | Spooner ...................... 455/411 |

FOREIGN PATENT DOCUMENTS

GB    2353918 A  *  3/2001

OTHER PUBLICATIONS

Crampton, J. "Understanding and Developing Role-Based Administrative Models", 2005, ACM p. 158-167.*

* cited by examiner

*Primary Examiner* — Qamrun Nahar

(57) ABSTRACT

Techniques are provided for determining a minimum set of permissions for a software component. A first set of minimum permissions is determined for proper execution of the software component. The first set designates one or more permissions. Determining the first set includes performing iterative testing to determine whether one or more user permissions are included in the first set by only disabling one of the user permissions on an iteration. Verification processing may be performed in which a second set of minimum permissions is determined and the first set may be compared to the second set to determine whether the first set is equivalent to the second set.

19 Claims, 7 Drawing Sheets

TECHNIQUES FOR MINIMUM PERMISSIONS DETECTION AND VERIFICATION

CROSS-REFERENCE TO RELATED APPLICATIONS

This patent application is related to U.S. patent application Ser. No. 11/013,503, entitled INTEGRATED SOFTWARE TEST FRAMEWORK FOR PERFORMANCE TESTING OF A SOFTWARE APPLICATION, filed on Dec. 15, 2004 and assigned to the same assignee as this application. The aforementioned patent application is incorporated herein by reference in its entirety.

Various embodiments are generally directed to determining permissions for software, and more specifically, to a technology for determining a minimum set of permissions for a software component using iterative testing and verification.

BACKGROUND

Testing is part of the software development process. It may be necessary to perform testing for various aspects of software including permission testing. Permissions testing may be characterized as ensuring that a user having a specified level or set of permissions is able to perform an action, such as in connection with the software under test, and that a user having insufficient permissions is otherwise unable to perform the action. Permissions testing may be performed with respect to software that has a public interface to ensure proper execution behavior. Performing permissions testing may present problems and complexities. First, the software under test may need to execute with the permissions of a user currently logged into a computer system. As part of testing such software, a user account may be created and set to execute with each of the varying sets of permissions. This can be time consuming and tedious for all test cases. Additionally, when executing as a user with limited permissions, there may be an insufficient level of permissions to interact with the operating system or other components to perform steps that may be needed to set up the testing for each test case. In other words, a set of permissions may be needed to perform certain processing steps for each test case. However, the test case itself may specify an insufficient set of permissions to allow the testing environment to be set up.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Described herein are techniques for determining a minimum set of permissions for a software component. A first set of minimum permissions is determined for proper execution of the software component. The first set designates one or more permissions. Determining the first set includes performing iterative testing to determine whether one or more user permissions are included in the first set by only disabling one of the user permissions on an iteration. Verification processing may be performed in which a second set of minimum permissions is determined.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
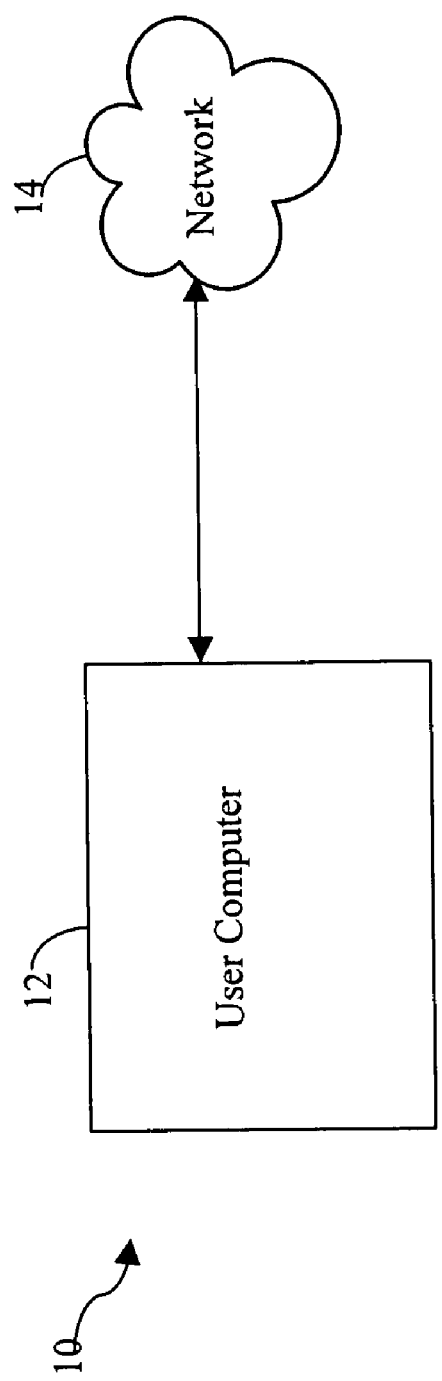
FIG. 1 is an example of an embodiment illustrating an environment that may be utilized in connection with the techniques described herein.

Referring now to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 is a user computer 12 and a network 14. The user computer 12 may include a standard, commercially-available computer or a special-purpose computer that may be used to execute one or more program modules. Described in more detail elsewhere herein are program modules that may be executed by the user computer 12 in connection with facilitating the permission detection and verification techniques described herein. The user computer 12 may operate in a networked environment and communicate with other computers not shown in FIG. 1. The user computer 12 may also operate as a standalone system.

It will be appreciated by those skilled in the art that although the user computer is shown in the example as communicating in a networked environment, the user computer 12 may communicate with other components utilizing different communication mediums. For example, the user computer 12 may communicate with one or more components utilizing a network connection, and/or other type of link known in the art including, but not limited to, the Internet, an intranet, or other wireless and/or hardwired connection(s).

Figure 2:
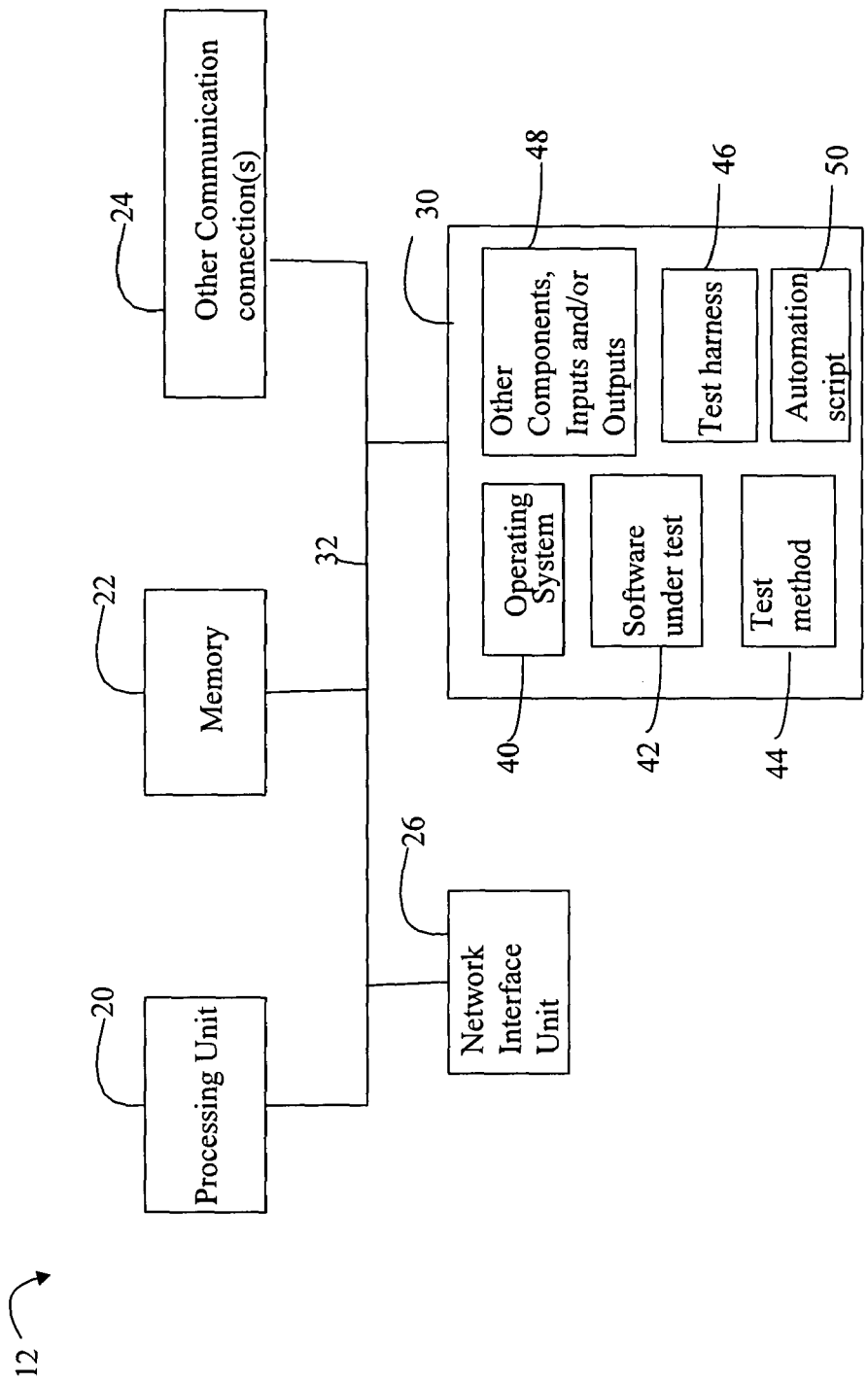
FIG. 2 is an example of components that may be included in an embodiment of a user computer for use in connection with performing the techniques described herein.

Referring now to FIG. 2, shown is an example of components that may be included in a user computer 12 as may be used in connection with performing the various embodiments of the techniques described herein. The user computer 12 may include one or more processing units 20, memory 22, a network interface unit 26, storage 30, one or more other communication connections 24, and a system bus 32 used to facilitate communications between the components of the computer 12.

Depending on the configuration and type of user computer 12, memory 22 may be volatile (such as RAM), non-volatile (such as ROM, flash memory, etc.) or some combination of the two. Additionally, the user computer 12 may also have additional features/functionality. For example, the user computer 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the user computer 12. The storage 30 in one embodiment may be a mass-storage device with associated computer-readable media providing non-volatile storage for the user computer 12. Although the description of computer-readable media as illustrated in this example may refer to a mass storage device, such as a hard disk or CD-ROM drive, it will be appreciated by those skilled in the art that the computer-readable media can be any available media that can be accessed by the user computer 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by user computer 12. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The user computer 12 may also contain communications connection(s) 24 that allow the user computer to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 24 are an example of communication media.

In one embodiment, the user computer 12 may operate in a networked environment as illustrated in FIG. 1 using logical connections to remote computers through a network. The user computer 12 may connect to the network 14 of FIG. 1 through a network interface unit 26 connected to bus 32. The network interface unit 26 may also be utilized in connection with other types of networks and/or remote systems and components.

One or more program modules and/or data files may be included in storage 30. During operation of the user computer 12, one or more of these elements included in the storage 30 may also reside in a portion of memory 22, such as, for example, RAM for controlling the operation of the user computer 12. The example of FIG. 2 illustrates various components including an operating system 40, software under test 42, a test method 44, a test harness 46, automation script 50, and other components, inputs, and/or outputs 48. The operating system 40 may be any one of a variety of commercially available or proprietary operating system. The operating system 40, for example, may be loaded into memory in connection with controlling operation of the user computer. The software under test 42 may be a software component, such as a code component, for which permissions testing and/or verification is being performed utilizing the techniques described herein. The test method 44 may be a portion of test code or script to be executed by the software under test 42, and may also include other test data. The test harness 46 may be used in connection with performing permissions testing and/or verification as described herein for the software under test 42 when executing the test method 44. The automation script 50 may be characterized as a driver script of commands controlling a testing session and execution of the testing harness 46. For example, the automation script may include commands processed by the test harness 46 in connection with the software under test 42 performing a developer written test, as may be represented by element 44. The other components, inputs and/or outputs 48 generally represent other elements that may be used in connection with performing the techniques described herein. The components illustrated in FIG. 2 are described in more detail in following paragraphs.

The techniques described in following paragraphs may be utilized in connection with determining and verifying minimum permissions for the software under test 42. The software under test 42 may be any one of variety of different software components at varying levels of granularity. For example, the software under test 42 may be a program as well as a function or routine. The software under test 42 may be a software component utilizing an object model allowing end users the ability to control certain aspects of the software component. Permission testing may be characterized as verifying that a user is prevented from performing an action if they have not been granted the necessary permissions, and that the user is allowed to perform an action if they have been granted the necessary permissions. In connection with the techniques described herein, software under test 42 is executed as a user with varying permissions utilizing an automated test harness 46. The test harness 46 may vary with embodiment to perform various testing set up tasks for testing the different permissions. One embodiment of a test harness is described in U.S. patent application Ser. No. 11/013,503, filed Dec. 15, 2004, MS Reference Number 310197.01, entitled INTEGRATED SOFTWARE TEST FRAMEWORK FOR PERFORMANCE TESTING OF A SOFTWARE APPLICATION, which is incorporated by reference herein. The foregoing particular implementation of the test harness may be written in C# and may be used in connection with performing permissions testing of a software component, such as software under test 42, utilizing the Windows SharePoint® Services (WSS) Object Model. The test harness 46 performs the processing steps described elsewhere herein in connection with performing the minimum permissions determination and/or verification processing including performing the set up tasks. The test harness 46 may be used in connection with testing various aspects of the software under test 42. Accordingly, a first indicator may be used to instruct the test harness to perform the minimum permissions and/or verification testing techniques. As will be described in more detail in following paragraphs, the first indicator may cause the test harness to execute in auto-detection mode in which the minimum set of permissions needed for the software under test 42 to execute the test method 44 are determined. Subsequently, a second indicator may cause the test harness to execute code for a second different mode, the verification mode, in which verification processing is performed for a specified set of permissions. In both modes, the automation test harness may perform processing including, for example, creating a new user account (or otherwise acquiring an existing user account), iterating through the end user's test code numerous times with a variety of permission levels, and then performing any subsequent clean up processing. In connection with the first auto-detection mode, the test harness 46 may track which permissions resulted in receiving permission denied errors and may output to the user the exact minimum amount of permission the software under test 42 needs to run successfully. When the test harness 46 executes in the second verification mode, the test harness may be used to verify the minimum set of permissions returned by the test harness 46 from previously executing in the first auto-detection mode.

It should be noted that an embodiment may trap the permission or accessed denied errors in connection with the verification process to determine whether the access succeeded or not. One type of an access denied error may be a runtime exception although other types of runtime errors may also signify a denial of permission or access.

It should be noted that although particular mention is made herein for purposes of illustration to performing functions in WSS regarding a website and associated user interface, as will be appreciated by those skilled in the art, there are a variety of different ways in which functions in WSS may be utilized in connection with the permission checking described herein. Accordingly, the use of the particulars in connection with such examples should not be construed as a limitation of WSS or the techniques described herein.

For example, a developer may wish to test a feature included in software under test 42 that uploads a new file to a website. The website may have a variety of different permissions, as may be specified using the Object Model of WSS. To support performing this operation at the website, the developer may have written software 42 which is executed when performing the upload operation. The developer may want to determine the minimum set of permissions needed to perform the feature for the website. A test method 44 may be written to exercise the software 42 and determine, using the test harness 46 and automation script 50, the minimum permissions necessary for the test method 44 to execute. In this example, the test method 44 may upload a file to the website using a random name. The test harness 46 may be executing an automation script 50 as part of testing. The test harness 46 may process a first indicator associated with the test method 44. This first indicator may be, for example, a C# attribute set on the test method 44. When this attribute is encountered, the test harness 46 performs some initial set up processing and then performs processing for the auto-detection mode in connection with execution of the test method 44. At some point, the test harness 46 outputs values indicating the minimum necessary permissions to execute the test method properly. Subsequently, the test method 44 is executed a second time when a second different indicator is specified causing the test harness 46 to perform processing for the verification mode to be performed. The second indicator may be, for example, a second C# attribute. Additionally, the minimum permissions determined from the first auto-detection mode may be input to the test harness in connection with the verification mode. The minimum permissions may be, for example, communicated as a scripting or other type of parameter. The test harness verifies that the specified minimum permission is in fact the minimum permissions needed. For example, if X, Y and Z are determined by the auto-detection processing as the minimum set of permissions, the verification processing takes this set of permissions as an input and verifies that specifying lesser permissions causes execution failure of the test method 44. As another example, a word processing application program may include macro functionality. A user may write code in the form of macros for performing different operations. A user may write code in the form of a macro which changes fonts by invoking a system function via an API (Application Programming Interface). In order to invoke the system function, a certain permission may be required. As part of testing the macro (42), the user may write a test module (44) to exercise the macro (42). As will be described in more detail in following paragraphs, the test module (44) is invoked using the test harness 46 to determine the necessary minimum permissions to execute the macro (42).

It should be noted that the techniques described herein may be used by a single application program, such as the foregoing word processing application, and determining minimum permissions for function calls within the single application. As will be appreciated by those skilled in the art, the techniques described herein may also be utilized in connection with minimum permissions associated with other levels of granularity besides function calls.

Although references are made herein to particular examples, it will be appreciated by those skilled in the art that the techniques described herein should not be construed as limited to those examples presented for purposes of illustration.

Figure 3:
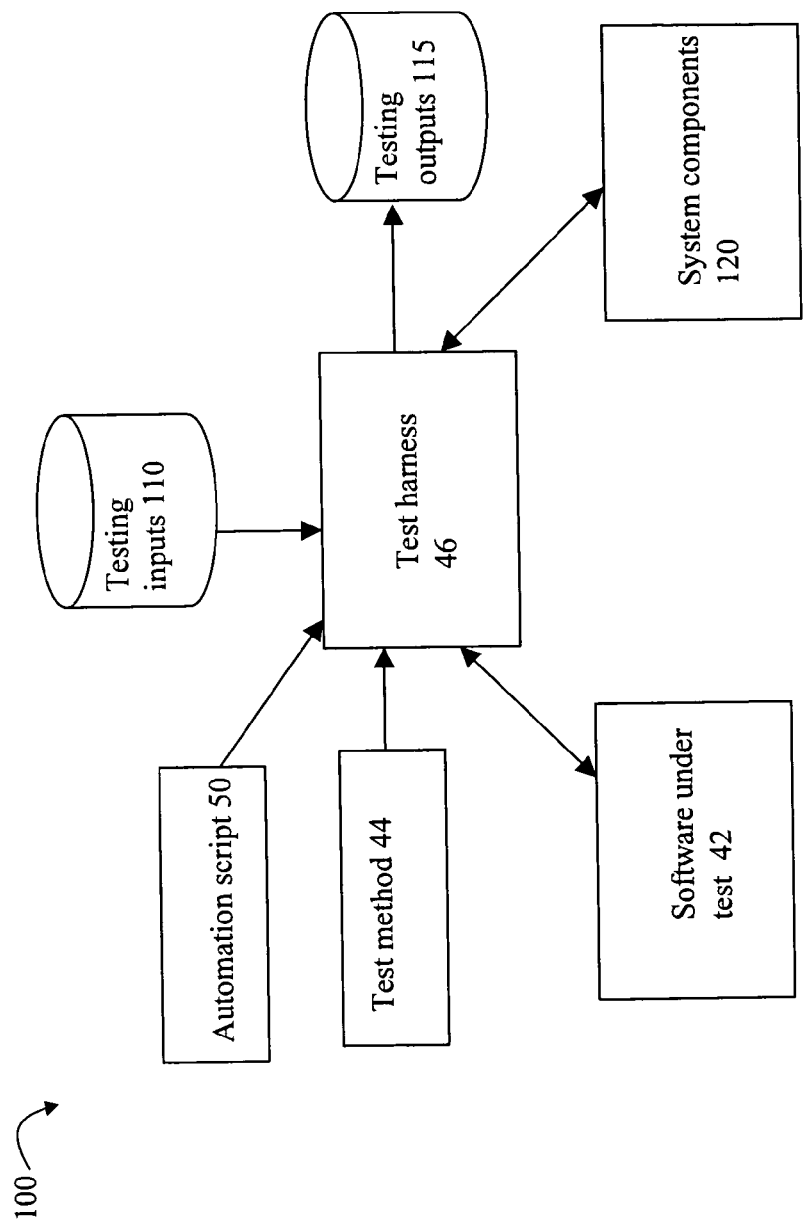
FIG. 3 is an example illustrating in more detail components from FIG. 2 that may be included in an embodiment utilizing the techniques described herein.

Referring now to FIG. 3, shown is an example illustrating in more detail components that may be included in an embodiment utilizing the techniques described herein. The example 100 includes some of the similarly numbered components from FIG. 2. The example 100 illustrates in more detail the interaction between those previously described components as well as some other components collectively represented by element 48 of FIG. 2. The automation script 50 includes a command which invokes the test harness 46. Also input to the testing harness 46 may be one or more inputs 110. These inputs may be specified as part of the automation script 50 and/or from other sources. The testing inputs 110 may include, for example, an indicator specifying an auto-detection mode or verification mode processing. If auto-detection mode is specified, the test harness 46 may produce the minimum permissions determined as a testing output 115. The minimum permissions may also serve as a testing input 110 for subsequent verification mode processing performed by the test harness 46. In connection with various operations that may be performed by the test harness 46, one or more system components 120 may be used. For example, in one embodiment, the test harness 46 may utilize one or more system components 120, such as system routines, to perform any necessary user account creation and deletion, modify the permissions for the user account, and the like.

Reference will be made herein to particular operations and use of WSS. However, the particular operations performed, for example, in connection with setup processing for each of the modes may vary with embodiment and code for which minimum permissions are being determined. As part of setup operations for both auto-detection and verification modes, the test harness may create a new user account, and adds that user account to the WSS security namespace for facilitating change of permissions in connection with testing. It should be noted that an embodiment may also utilize accounts already in existence rather than having one created for use by the test harness. It should be noted that as described herein, in order to perform the permission testing, the test case has to run under the selected user account. In the auto-detection mode, the automation script instructs the test harness to iteratively determine the set of permissions necessary to allow the test method to execute without problems. In this auto-detection mode, as will be described in more detail, the test harness starts at the highest or most permissive set of permissions and iterates through all permissions. In the verification mode, the automation script provides the harness with a set of permissions and the test harness verifies that this set of permissions is the minimal set of permissions that will work properly for the test method. In other words, it is verified that the test method will execute successfully with the specified set of permissions, but will fail in any lesser set of permissions. In this verification mode, the test harness starts with the specified set of permissions and expects the test method to succeed. The test harness may then perform processing, in a manner that may be characterized as a limited version of auto-detection processing, and iterate through all permissions that are less than the specified set passed in via the automation script. As a result of verification mode processing, the test harness may return true if the specified permissions are the minimum permissions necessary for executing the test method, and false otherwise. A returned result of true, means the test case passed, while a return value of false means the test case failed.

In one embodiment, functionality may be included for account creation and execution of code at varying permission levels without logging on and off as a particular user. The embodiment may use, for example, the .NET™ framework allowing for specification of an execution environment so that code is executed as a particular user with associated permission level.

The WSS Object Model used in this example has two general classes of permissions-administrative and user. Within the administrative class, there may be designated subclasses or levels of administrative permissions such as, for example, windows administrator, farm administrator, and site collection administrator. The general administrative class may also be characterized as a super user category or classification specifying permissions for different administrative operations. The administrative classification utilizes permissions in addition to what may be designated for user level permissions. In this example, the user level permissions may be specified using a 64-bit security model. There can be defined up to 64 user level permissions each having a designated bit value of 1 (on) when the user account has the associated permission, and a 0 (off) otherwise. In the auto-detection mode, processing proceeds with the permissions from the highest, or most permissive administrative subclass, to the lowest and least permissive administrative subclass. Subsequently, the auto-detection processing traverses all user level permissions in which all user level mode permission bits are initially on and a different one of the bits is set to off for each subsequent iteration. In other words, a first iteration may have all bits on. A second iteration may have all bits on except for the permission associated with bit position 1. On a next iteration, all bits are on except for bit "2", and so on, until all 64 permissions, each associated with a different bit position, have been tested in the off designation.

In connection with the verification mode, processing is performed for all specified permissions of the previously determined minimum set of permissions. The test method is expected to execute without any permission errors for this minimum set. Subsequently, iterative processing is performed in which one of the minimum set of permissions is removed/turned off. The test method is expected to fail in this instance. This process of turning off only one bit and executing the test method is performed for each of the permissions in the minimum set.

Both the auto-detection mode processing and the verification processing generally commence at a start state of permissions and then continuously iterate moving to a next state of permissions until an end state of permissions is reached.

Figure 4:
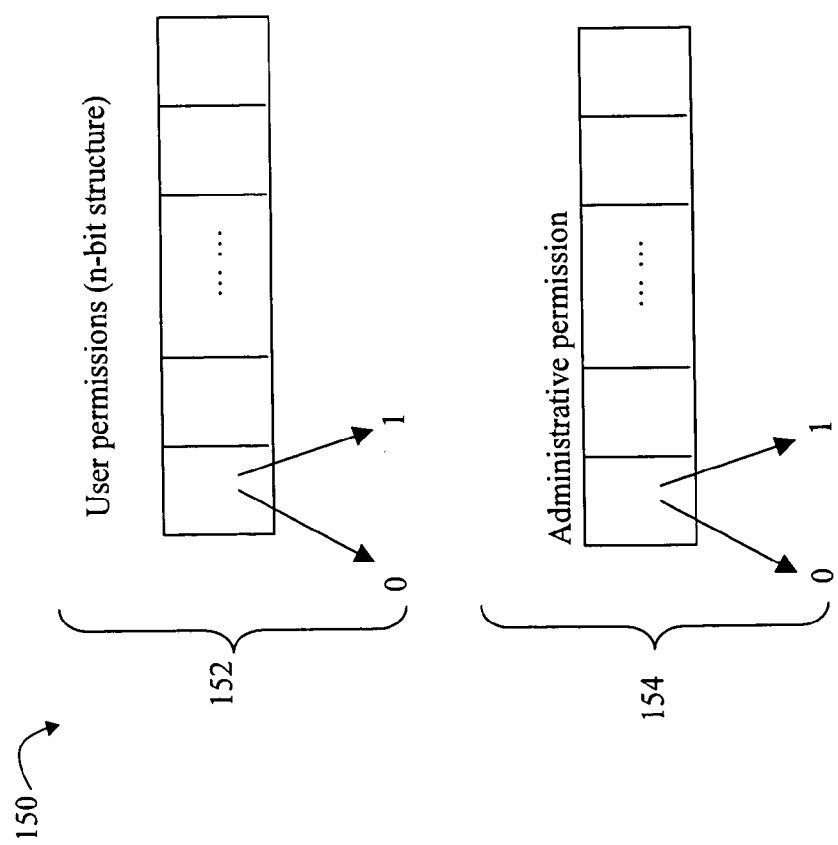
FIG. 4 is an example illustrating an embodiment of a user permissions structure.

Referring now to FIG. 4, shown is an example representation of permissions structures that may be used in an embodiment with the techniques described herein. The example 150 includes a user permissions structure 152 and an administrative permissions structure 154. The user permissions structure 152 may be, for example, 64 bits in length if used in connection with an embodiment having that particular number of user level permissions. It will be appreciated by those skilled in the art that the number of bits may vary with embodiment. A first instance of the structure 152 may be used, for example, in specifying user level permissions being tested for a particular iteration. A second instance of the structure 152 may also be used in tracking which particular bit positions have resulted in execution failure of the test method. An instance of the structure 152 may be used, for example, in communicating an output of a minimum set of permissions determined by the auto-detection mode processing, as well as an input of the minimum set of permissions for the verification mode processing. The administrative permissions structure 154 similarly may be used to indicate and track administrative permissions used in connection with the techniques described herein and the size in bits of structure 154 may vary with the number of administrative subclasses. It should be noted that the structure 154 may have a bit position associated with each administrative subclass. Testing is performed with respect to iterating through all administrative bits as each administrative subclass is tested (on) and recording the execution results of the test method for that administrative subclass level of permission. In other words, as described herein, the administrative permissions may be characterized as distinct from the user level permissions in that at most a single administrative permission can be on. In connection with user level permissions, more than one as indicated by the corresponding bit positions can be on.

Figure 5:
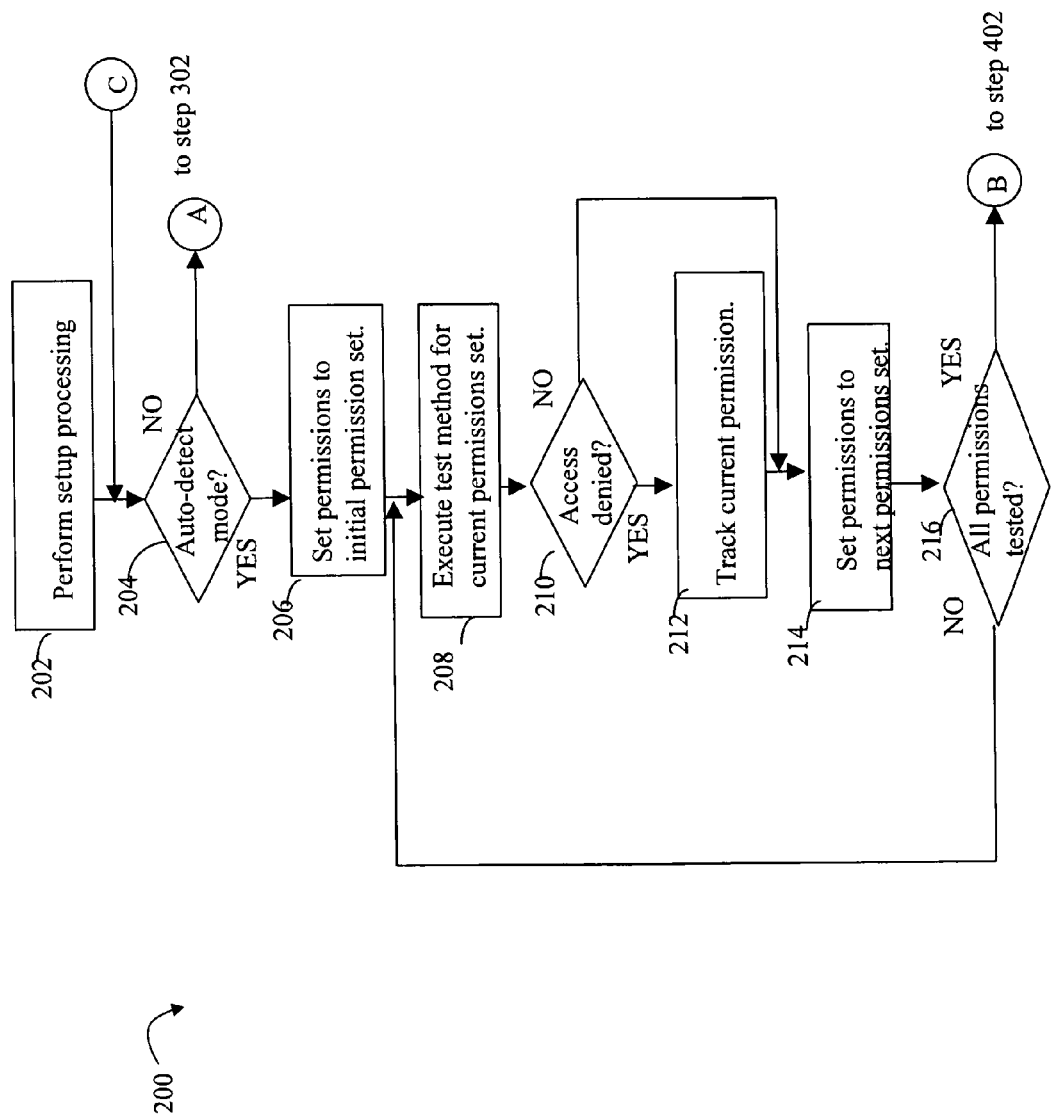
FIGS. 5-7 are flowcharts of processing steps that may be performed in an embodiment utilizing the permissions determination and verification techniques described herein.
Figure 6:
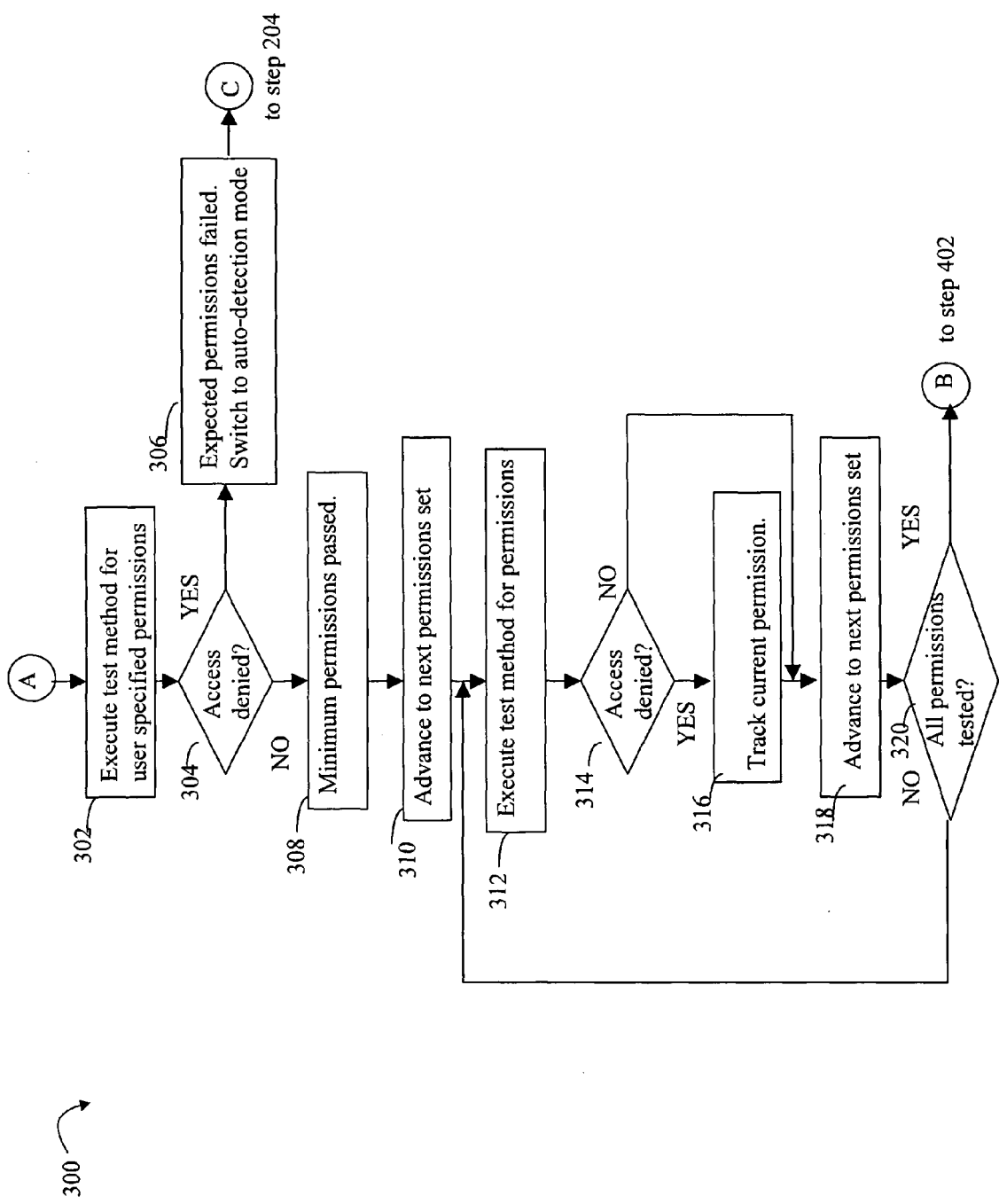
Figure 7:
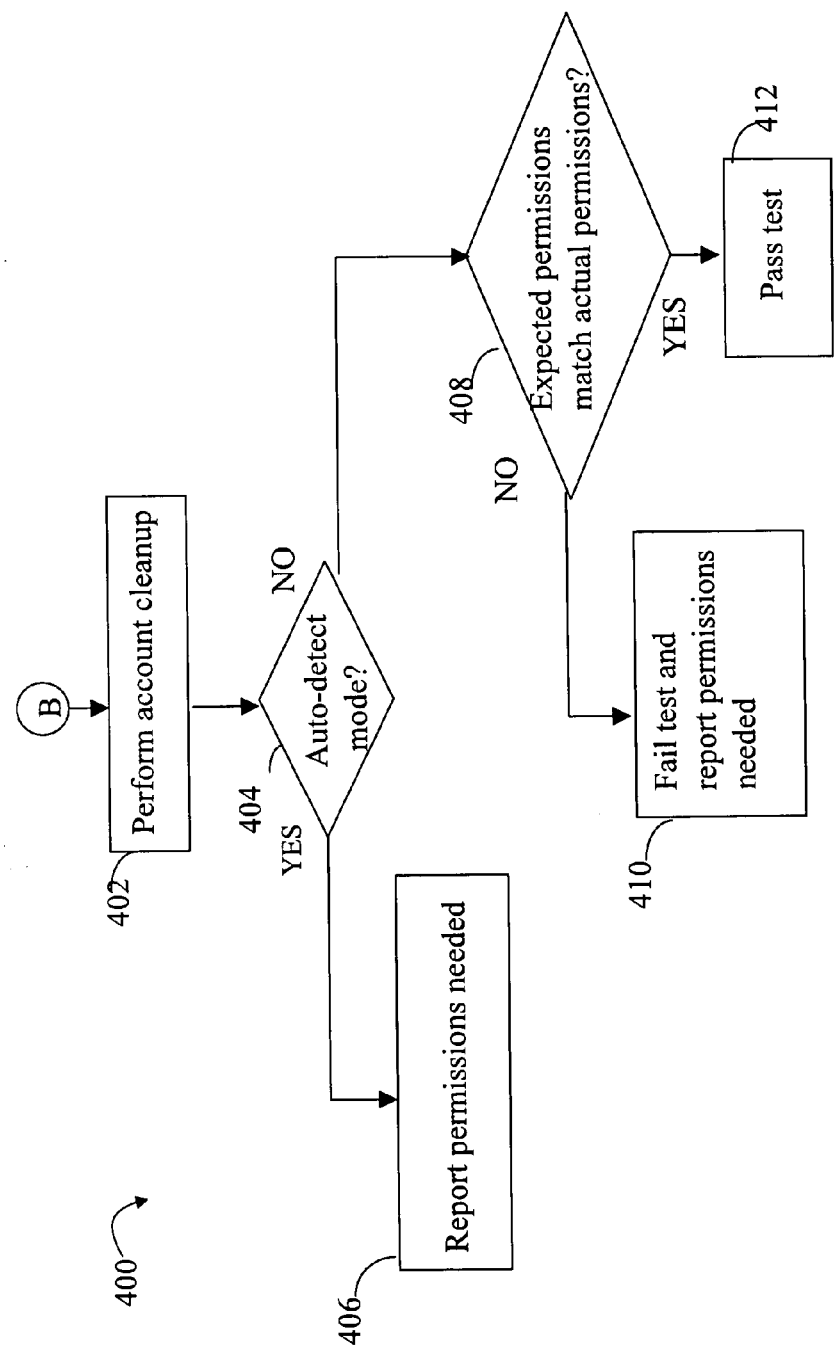

Referring now to FIGS. 5-7, shown are flowcharts of processing steps that may be performed in an embodiment in connection with performing the techniques described herein for determining a set of minimum permissions and verification of the same. The processing steps in these flowcharts generally summarize the processing just described above. The steps of the flowcharts may be performed by the test harness when invoked for use in connection with the techniques described herein. At step 202, set up processing is performed. As described herein for use in connection with WSS, a new user account may be created and other processing performed to facilitate permissions setting. As an alternative, an existing account may be acquired for use in connection with subsequent processing. At step 204, a determination is made as to whether auto-detection mode processing is specified. If not, control passes to step 302 to perform verification processing. If step 204 evaluates to yes, control proceeds to step 206 to set the account permissions to the initial state. In this example, all the administrative permissions are each tested and then the various user level permissions are tested. In connection with the user level permissions, testing is performed with all user permissions initially on. Subsequently, testing is performed with each user level permission turned off, one at a time, and all other permissions on. The foregoing characterizes the set or state of permissions tested in connection with FIG. 5 processing for auto-detection mode. At step 208, the test method is executed with the current set of permissions. The user account is set to have the current set of permissions prior to execution of the test method, as in step 206. At step 210, a determination of the execution status of the test method is determined. If access to perform the particular operation is denied, control proceeds to step 212. It should be noted that failure may occur due to lack of sufficient permissions. Information regarding permissions associated with the failed access is recorded in accordance with the current set of permissions. If processing user permissions, it is determined that the current permission is one of the minimum permissions. Information may be tracked using, for example, the structures described in connection with FIG. 4. Control proceeds to step 214 where the next set of permissions to be tested is determined. At step 216, a determination is made as to whether all permissions have been tested. If not, control proceeds to step 208. Otherwise, control proceeds to step 402 for cleanup processing. If access is not denied at step 210, control proceeds directly to step 214.

If step 204 evaluates to no indicating that verification mode has been specified, processing proceeds to step 302. At step 302, the user account is set in accordance with the initial set of permissions as specified by an input to the test harness. The test method is executed for this initial set of permissions. In this verification mode, the specified permissions input are the minimum set of permissions for which verification processing will now be performed. At step 304, a determination is made as to whether access has been denied. If step 304 evaluates to yes, the expected permissions have failed. This means that the input specifying the minimum set appears to have been in error and control proceeds back to step 204 to again determine the minimum set of permissions. If step 304 evaluates to no, control proceeds to step 308 where it is determined that the minimum permissions have passed the test method, as expected. Control proceeds to step 310 to advance to the next set of permissions. If the minimum permissions specify an administrative level, only subsequently lower administrative subclasses are tested in connection with the verification processing of 300. If the minimum permissions specify a user level of permissions, verification processing is performed by turning off, on subsequent iterations, only each one of the included user permissions. For example, if the minimum set of user permissions is 3, step 302 is performed with all the minimum set of permissions on, and all other permissions off. Subsequent permissions states are determined by turning off one permission in the minimum set at a time with all other minimum permissions on. The test method is then executed for this permissions state. In the example in which the minimum permissions include 3 user permissions, three processing iterations of the loop beginning at step 312 are performed in which only one of the 3 permissions are turned off for each iteration with the remaining other 2 permissions on. At step 312, the test method is executed for the current permissions. At step 314, a determination is made as to whether access for performing the test method has been denied. If so, control proceeds to step 316 to save the permission information. If testing user permissions, the user permission which was turned off is saved since it is determined this user permission should be included in the minimum set. When testing administrative permission levels, it is expected that the lower administrative permission levels will fail and step 316 may track which administrative permission levels fail. Control proceeds to step 318 to advance to the next permissions set. At step 320, a determination is made as to whether all permissions have been tested. If so, control proceeds to step 402 to perform cleanup processing. Otherwise, control proceeds to step 312. If step 314 determines that access has not been denied, control proceeds to step 318 directly.

At step 402, cleanup processing is commenced in which account cleanup is performed. Step 402 processing includes, for example, removing user account. At step 404, a determination is made as to whether auto-detection mode processing has been performed. If so, control proceeds to step 406 to report the minimum permissions determined. Otherwise, control proceeds to step 408 where a determination is made as to whether the expected minimum permissions (e.g., designated as an input for verification processing) match the actual minimum permissions determined. If step 408 evaluates to no, control proceeds to step 410 where it is determined that the verification processing has failed and the minimum permissions determined during verification processing may be output. If step 408 evaluates to yes, control proceeds to step 412 to indicate successful verification processing.

It should be noted that the set-up and clean-up processing steps may include other steps than as described herein and may vary with embodiment and the various operations performed.

In an embodiment using the WSS permissions model using a 64 bit integer to represent 64 different permissions that a given user could possess, only a portion of the 64 permissions associated with the 64 bits may be actually utilized in a particular version being utilized with the techniques described herein. As described above during the auto-detection mode processing, the test harness first verifies that a user with all 64 permissions can successfully run the test method. Then, the test harness iterates through each of the 64 permissions in turn, giving the current user account all permissions except for the current permission. If that current permission is required, then the test harness expects the test method to throw an access denied exception which the test harness addresses and records that this permission was required. If the current permission is not required and no access is thrown, then the test method will pass. Once the test harness finishes all 64 user permissions, it will inform the user of which permissions are determined as being included in the minimum set.

When in the Verification mode, the harness firsts verifies that a user with the passed in set of permissions can successfully run the test method. If not, then some additional permission is required and the test harness switches into auto-detection mode to properly determine the correct permissions. If the input set of permissions specifies user permissions and the test method executing therewith is successful, then the test harness iterates through the input set of user permissions, but skips any permission that was not included in the input set. For administrative permissions, it is expected that all lower level administrative permissions cause an access denied. Once the test harness finishes, a determination of pass or failure is made depending on whether the minimum permissions auto-detected (e.g., as indicated by the input set of permissions) match the permissions determined during verification.

It should be noted that the particular permissions included in an embodiment may vary from as described herein. In an embodiment using the foregoing permissions, the embodiment may be characterized as having a permissions hierarchy in which there is no permission overlap. For example, in connection with user permissions, no two user permissions may satisfy the same condition. In other words, in an embodiment which does not have overlapping permissions, there is only one possible minimum set of permissions. In an embodiment which does include overlapping permissions, it may be determined that there are two or more minimum sets of user permissions in accordance with a degree of overlap. For example, let user permission 1 or 2 satisfy a particular permission criteria. Two minimum permissions sets may be represented as (1, 3, 5) and (2, 3, 5) indicating the required enumerated user permissions. The foregoing auto-detection processing would determine the minimum permissions as being only (3,5). An embodiment may use other techniques, such as having the user specify which permissions overlap or satisfy the same permission criteria. In this example, the user may specify that permissions 1 and 2 overlap. Verification processing may then be performed for each of the minimum permission sets. The foregoing is one example of an embodiment with overlapping permissions. As will be appreciated by those skilled in the art, the techniques described herein may be readily modified for use with embodiments having one or more overlapping permissions.

Although a test harness has been described for use herein, other embodiments may use other techniques in connection with determination and/or verification of the minimum permissions. As will be appreciated by those skilled in the art, although an embodiment may perform both the techniques of auto-detection and verification, an embodiment may perform the techniques described herein in connection with auto-detection of permissions without performing the verification processing. Similarly, an embodiment may perform the techniques in connection with verification without performing the auto-detection techniques.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining a minimum set of permissions for a software component comprising:
    enabling all user permissions;
    performing iterative testing by:
        disabling only one of said all user permissions on each iteration with all other user permissions enabled,
        determining whether the software component can properly execute on each iteration; and
        recording information about the permissions when the software component does not properly execute on a iteration; and
    determining a first set of minimum permissions according to the recorded information, wherein said first set of minimum permissions includes the smallest set of permissions for which said software component will properly execute.

2. The method of claim 1, further comprising:
    performing verification processing and determining a second set of minimum permissions; and
    comparing said first set to said second set to determine whether said first set is equivalent to said second set, and wherein said determining, said performing and said comparing are performed using a test harness.

3. The method of claim 2, wherein said test harness executes in an auto-detection mode to perform said method for determining, and a verification mode to perform said performing and said comparing steps.

4. The method of claim 2, wherein said first set is determined to be said minimum set if said first set is equivalent to said second set.

5. The method of claim 3, wherein if said first set includes user permissions, said verification processing further comprises:
    determining whether said software component successfully executes using said first set of permissions.

6. The method of claim 5, further comprising:
    if said software component does not successfully execute using said first set of permissions, reperforming processing associated with said auto-detection mode.

7. The method of claim 6, further comprising:
    if said software component does not execute properly when only said one user permission is disabled, determining that said one user permission is included in said second set.

8. The method of claim 1, wherein said iterative testing includes testing one or more administrative permissions, said one or more administrative permissions forming a hierarchy in which only one administrative permission can be designated for a user account.

9. The method of claim 2, wherein said test harness automatically creates a user account and automatically sets permissions for said user account in accordance with processing performed by said test harness.

10. The method of claim 3, wherein a mode for executing said test harness is indicated by an indicator associated with an invocation of a test function for testing said software component.

11. The method of claim 3, wherein said first set of permissions is passed as an input to said test harness when executing in said verification mode.

12. The method of claim 1, wherein said software component executes in an environment including at least one overlapping permission.

13. The method of claim 1, wherein said software component executes in an environment which does not include any overlapping permissions.

14. A test harness for determining a minimum set of permissions for a software component, said test harness comprising computer executable instructions stored on a computer readable storage medium for performing the steps of:
    receiving a first set of minimum permissions for proper execution of said software component, wherein said first set designates one or more permissions, said first set of minimum permissions being determined by executing a first set of processing steps, wherein said first set of minimum permissions includes the smallest set of permissions for which said code component will properly execute;
    enabling all of the first set of minimum permissions;
    executing a second set of processing steps when in a verification mode, said second set of processing steps including:
        iteratively disabling only one of said first set of minimum permissions on each iteration with all other first set of minimum permissions enabled,
        determining whether the software component can properly execute on each iteration; and recording information about the permissions when the software component does not properly execute on an iteration;

performing verification processing and determining a second set of minimum permissions according to the recorded information; and comparing said first set to said second set to determine whether said first set is equivalent to said second set.

15. The test harness of claim 14, further comprising:

executing said first set of processing steps when in an auto-detection mode, said first set of processing steps including:

determining said first set of minimum permissions for proper execution of said software component, wherein said first set designates one or more permissions, said determining including performing iterative testing to determine whether one or more user permissions are included in said first set by only disabling one of said user permissions on an iteration; and wherein if said first set includes one or more user permissions, said second set of processing steps further comprises:

determining whether said software component successfully executes using said first set of permissions.

16. The test harness of claim 15, wherein said second set of processing steps further comprises:

if said software component does not successfully execute using said first set of permissions, reperforming processing associated with said auto-detection mode.

17. The test harness of claim 16, wherein said second set of processing steps further comprises:

performing iterative testing by disabling only one of said user permissions included in said first set on an iteration.

18. The test harness of claim 17, wherein said second set of processing steps further comprises:

if said software component does not execute properly when only said one user permission is disabled, determining that said one user permission is included in said second set.

19. A computer readable storage medium having computer executable instructions stored thereon for performing steps for determining a minimum set of permissions for executing a code component, the steps comprising:

enabling all user permissions;

performing iterative testing by:

disabling only one of said all user permissions on each iteration with all other permissions enabled, determining whether the software component can properly execute on each iteration; and recording information about the permissions when the software component does not properly execute on a iteration;

determining a first set of minimum permissions according to the recorded information, wherein said first set of minimum permissions includes the smallest set of permissions for which said code component will properly execute; and performing verification processing using said first set of minimum permissions, said verification processing including:

determining a second set of minimum permissions; and comparing said first set to said second set to determine whether said first set is equivalent to said second set.

* * * * *